United States Patent [19]

Ringot et al.

[11] Patent Number: 5,188,211
[45] Date of Patent: Feb. 23, 1993

[54] APPARATUS FOR ORIENTATING LOAD ON A LINEAR CONVEYOR

[75] Inventors: Jean-Marc Ringot, Carnin; Henri Sauvaige, Lille, both of France

[73] Assignee: Cartonneries de la Lys-Ondulys, Lomme, France

[21] Appl. No.: 754,603

[22] Filed: Sep. 4, 1991

[51] Int. Cl.⁵ ............................................. B65G 47/24
[52] U.S. Cl. .................................... 198/411; 198/413
[58] Field of Search ............... 198/411, 413, 374, 395, 198/415, 416, 394

[56] References Cited

U.S. PATENT DOCUMENTS

| | | | |
|---|---|---|---|
| 2,716,497 | 8/1955 | Wahl et al. | 414/792.9 X |
| 2,761,542 | 9/1956 | Pagdin | 198/374 X |
| 2,963,143 | 12/1960 | Field | 198/416 X |
| 3,732,968 | 5/1973 | Fedor et al. | 198/395 |
| 4,312,266 | 1/1982 | Pasic | 198/411 |
| 4,927,133 | 5/1990 | Evans | 198/416 X |
| 4,993,536 | 2/1991 | Bell | 198/411 X |

FOREIGN PATENT DOCUMENTS

| | | |
|---|---|---|
| 372579 | 3/1983 | Austria . |
| 2654824 | 6/1978 | Fed. Rep. of Germany . |
| 2754625 | 6/1979 | Fed. Rep. of Germany ...... 198/374 |
| 926776 | 4/1985 | Fed. Rep. of Germany ...... 198/411 |
| 3524339 | 1/1987 | Fed. Rep. of Germany ...... 198/411 |
| 2297772 | 8/1976 | France . |
| 0023115 | 3/1981 | Japan ................................... 198/411 |
| 59-26819 | 2/1984 | Japan . |

OTHER PUBLICATIONS

English abstract of Japanese Patent No. 59-26819.

*Primary Examiner*—D. Glenn Dayoan
*Assistant Examiner*—Cheryl L. Gastineau
*Attorney, Agent, or Firm*—Sandler, Greenblum & Bernstein

[57] ABSTRACT

Apparatus for orientating loads on a linear conveyor for pivoting loads on a motor roller track to facilitate the storage of loads on pallets of a palletizer. The apparatus includes a transversely mobile controlled stop, and the movement of the stop can correspond either substantially or exactly to the peak of a sine curve. The movement of the stop enables it to maintain a substantially fixed point of contact with the load.

10 Claims, 3 Drawing Sheets

5,188,211

APPARATUS FOR ORIENTATING LOAD ON A LINEAR CONVEYOR

BACKGROUND OF THE INVENTION

1. Field of the Invention

The invention relates to a device for orientating loads on a linear conveyor, as well as to an application of the device to a palletizer. It will find an application particularly with constructors of automatic handling equipment.

2. The Prior Art

Linear conveyors are very widely used in the industry for ensuring the transport of goods between different manufacturing stations. With new technological developments, an automated load gripping device is more and more frequently encountered at the end of the conveying chain. This is the case, for example, in boxing stations with palletizers which are installations designed to store loads such as, in particular, packages or boxes, on pallets.

In order for these automatic installations to function correctly, certain vital criteria have to be observed. In particular, the loads on the linear conveyor have to be correctly spaced and orientated. These two criteria are dictated by the work station located upstream of the linear conveyor on which the loads are actually placed. Here, we very often find automatic installations capable of working at given rate which dictates the interval between the packages and also, in accordance with geometrical output criteria, which necessitates a given position of the packages on the linear conveyor.

Generally, when the load is centered on the linear conveyor, and when a parallelepipedic object is involved, it is placed either transversely or longitudinally on the conveyor.

In certain applications, this fixed orientation of the load on the conveyor can be an impediment. For example, with automatic palletizers, it is necessary to place the load sometimes longitudinally and sometimes transversely on the pallet and, consequently, the package on the linear conveyor has to be in the desired position.

This alternative possibility is difficult to impose on the preceding work station and, consequently, use has to be made of a device for orientating the loads on the linear conveyor in order to place the package in the desired position.

At the present time, devices are known that are capable of orientating a load in a fixed position. This takes the form, for example, of a motorized lateral belt against which the package is pressed so that it bears against the belt and is correctly orientated.

However, when it is necessary to pivot the load through an angle of rotation of up to a quarter of a turn, the constructors offer few solutions.

One known solution consists in using a crossarm housed in the linear conveyor. The load is immobilized above the crossarm which is then raised, supporting the load, to disengage it from the rollers of the conveyor. The crossarm can then pivot to orentate the load and, once this operation has been accomplished, it is lowered again to retract into the rollers and leave the load to be moved on again, correctly orientated.

This device has three major defects. In the first place, there is an interruption in the continuous translation movement since the load is immobilized during its rotary movement. This considerably reduces the working rate of the linear conveyor.

Secondly, this technique can be applied only to loads of relatively small dimensions, low inertia and reasonable weight. In addition, the rotation is generally at least 90°.

Emphasis should also be placed on the costly nature of this mechanism, which uses a combination of different jacks.

SUMMARY OF THE INVENTION

The main object of the present invention is to provide a device for orientating loads on a linear conveyor which makes it possible to overcome drawbacks of the known systems and one advantage of which is that it does not interrupt the continuous advance of the goods. This makes it possible to sustain very high working rates without any risk of bottlenecks or the accumulation of packages.

Furthermore, the load orientating device according to the present invention can be applied to loads of very large dimensions and very heavy weights.

Another advantage of the present invention is that it provides a load orientating device that is highly economical thanks, in particular, to the simplicity of the equipment used.

In operation, the loads are pivoted gradually and smoothly, which makes it possible, for example, to work with objects arranged in unattached piles without any risk of the pile collapsing or at the very least being disturbed.

Furthermore, the present invention advantageously accommodates unlimited rotary movements such as:

precise rotation from 0° to 90° for a device with one stop, and from 0° to 180° for a device with two stops, rotation in one direction or another, rotation about the center of area, the load remaining centered on the conveyor, rotation as from a precise point of the load through the initial positioning of the stop, rotation without halting either the conveyor or the load.

Another object of the present invention is to propose an application of the device according to the invention to a palletizer to facilitate the storing of the loads or packages on the pallet.

Further objects and advantages of the present invention will emerge from the following description which is only provided, however, by way of example.

According to the invention, the device for orientating loads on a linear conveyor, such as, in particular, packages on a motor roller track, is characterized by the fact that it takes the form of at least one controlled stop that is transversely mobile in relation to the direction of movement of the load on the conveyor.

The invention will be more clearly understood from studying the following description accompanied by the annexed drawings, wherein:

THE DRAWINGS

FIGS. 1a, b, c schematically represent the different working phases of the load orientating device according to the present invention, FIG. 2 represents a diagram of lateral displacement of the stop as a function of time.

FIG. 3 represents a combination of the apparatus for orientating loads according to the present invention together with a palletizer including a pallete for receiving the oriented loads.

DESCRIPTION OF THE PREFERRED EMBODIMENT

The present invention relates to a device for orientating loads on a linear conveyor, such as, in particular, packages on a motor roller track, as well as to an application of the device to a palletizer. It is intended chiefly for the constructors of automatic handling equipment.

Linear conveyors are widely used in the industry for ensuring the transport of goods between the different work stations. In the case of fully automated installations, the objects are placed on and taken from the linear conveyor by means of robot machines.

It sometimes proves necessary to modify the orientation of the loads on the linear conveyor so that they can be picked up in a correct position with a view to their subsequent storage. This is encountered, for example, in boxing operations, in particular with automatic palletizers. The machine itself is incapable of orientating the package; this has to be presented to the machine in the correct position in order to be taken up from the linear conveyor and placed on a storage pallet.

To take the example of parallelepipedic packages, optimum storage on a pallet sometimes requires certain packages to be placed longitudinally and other packages transversely in order to occupy the entire surface area of the platform. In this case, the palletizer has to receive packages that are orientated sometimes longitudinally and sometimes transversely. The transfer machine located upstream of the boxing area is very often itself unable to orientate the loads into a correct position and it is necessary to use a preparation station specially adapted for this purpose.

This is the context of application of the device for orientating loads on a linear conveyor according to the present invention which offers, in addition, the advantage of not interrupting the continuous advance of the packages. The working rate is thus fast and the capacity for handling large, heavy loads is considerable.

Figure 1A:
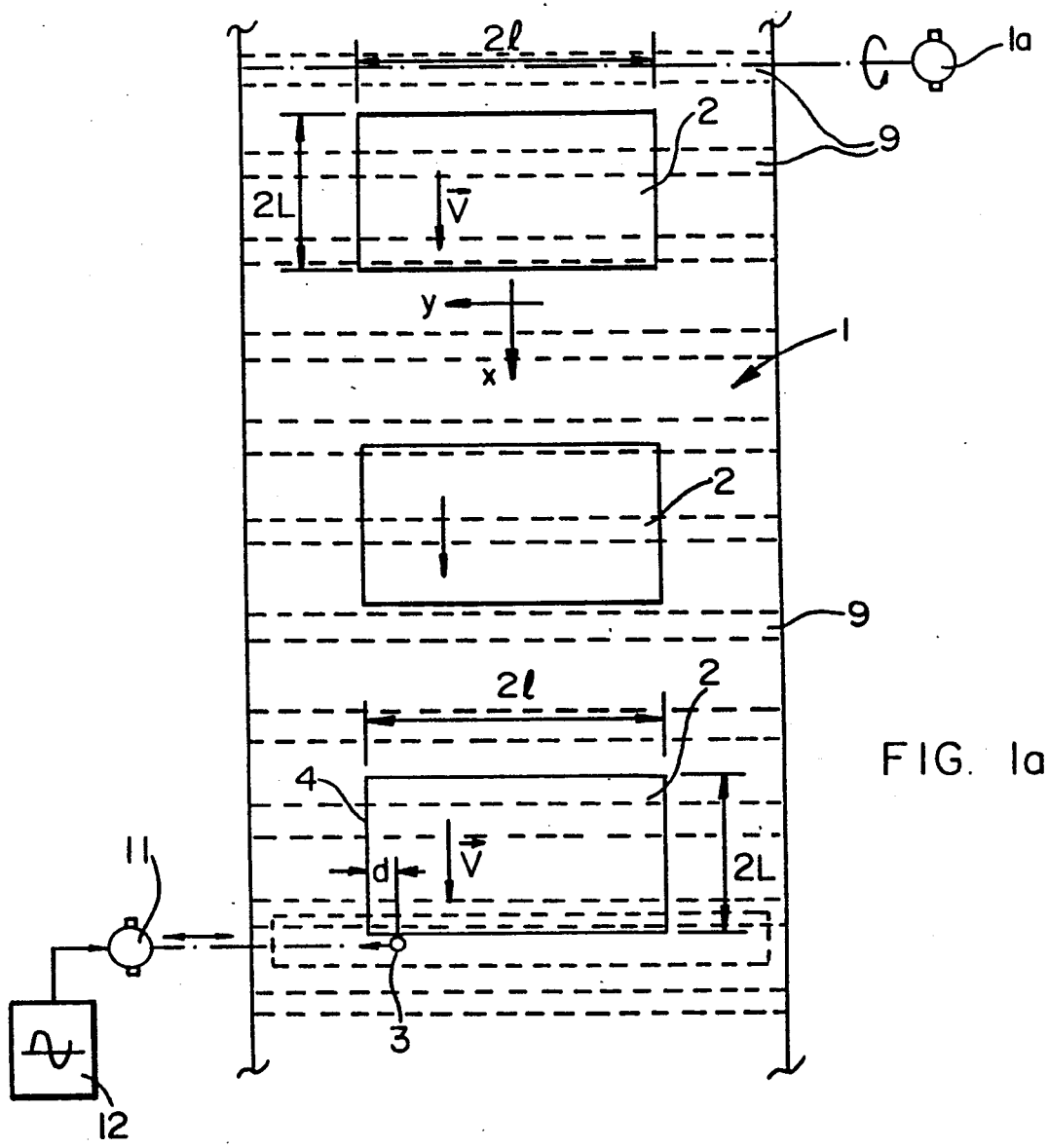

The operating principle of the device for orientating loads on a linear conveyor is schematically represented in FIGS. 1a, b and c.

First of all, a linear conveyor 1 of the traditional type is provided.

The loads 2 are driven in a linear displacement movement by conveyor 1. In the example chosen, the packages are parallelepipedic in shape, which corresponds to the majority of cases encountered. These loads 2 can further be constituted by a pile of superposed objects. Indeed, the gradual nature of the action of the orientating device of the present invention makes it possible to handle piles of unattached objects without any risk of the pile collapsing.

In the example in FIG. 1, the loads or packages 2 are placed transversely on the linear conveyor 1 and the role of the load orientating device according to the present invention is to modify the prior positioning of loads 2 to dispose them longitudinally on linear conveyor 1 by pivoting them.

According to the main feature of the present invention, the load orientating device takes the form of at least one controlled stop 3 that is transversely mobile in relation to the direction of displacement of the load on the conveyor.

The use of a fixed stop is known to the man of the art and its action is very limited. Not only does a fixed stop not enable the load to be pivoted by a quarter of a turn but it also exerts a pressure that tends to deflect the package laterally. Furthermore, its precision is generally highly inadequate.

With a mobile stop, these drawbacks are overcome; it is possible to orientate a load through an angle of rotation that is variable between 0° and ±90°. In addition, by using two successive controlled mobile stops, it is possible to permit a rotation of 0° to ±180°.

Furthermore, any lateral deflection of the load is avoided, the latter remaining centered on the linear conveyor, which is essential with automatic gripping installations which require precise positioning of the packages.

In the case of a roller conveyor, the stop or stops can be designed to project between two parallel rollers 9 of the roller track. As is schematically illustrated in FIG. 1(a), the rollers 9 can be driven by a driving motor 10.

The movement of the stop 3 is controlled so as to have, either substantially or precisely, a fixed point of contact on load 2. At the outset, when the package arrives, it comes into contact with stop 3, as illustrated in FIG. 1a, and rotation commences.

Figure 1B:
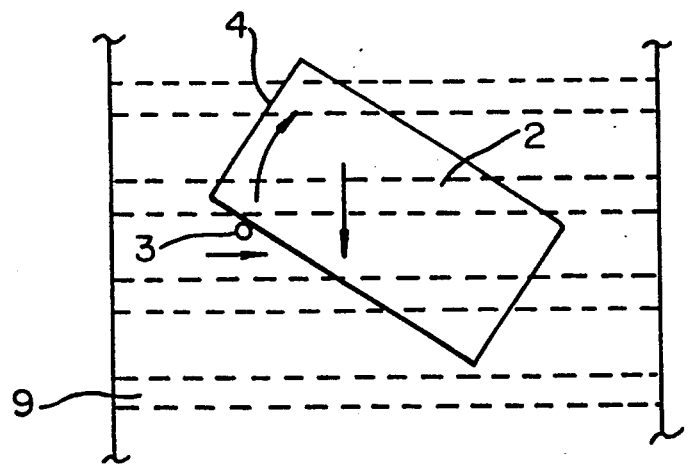
Figure 1C:
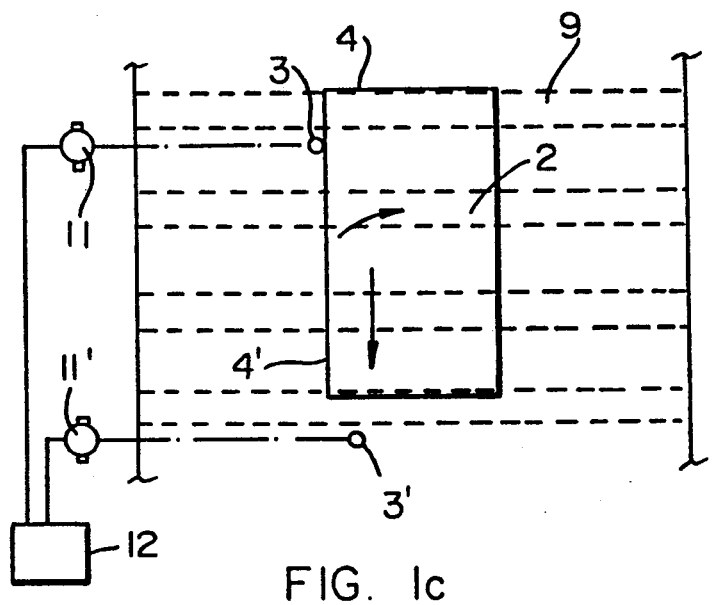

Stop 3 then moves away from the central axis of conveyor 1 to follow the rotary movement of load 2 as illustrated in FIG. 1b. This movement of withdrawal of stop 3 must substantially continue until the diagonal of package 2 is parallel with the transversal line of conveyor 1. Once this stage has been reached, stop 3 then has to push back the rear portion of load 2 as illustrated in FIG. 1c in order to bring package 2 into a longitudinal direction in relation to conveyor 1.

A study of the movement will show that, at any time, stop 3 can be moved away from package 2 to orientate the latter by any angle of less than a quarter of a turn. In addition, during the action of pivoting load 2, the latter continues its movement of linear advance, which enables the linear conveyor to retain its transport capacity.

The continuously controlled action of mobile stop 3 further makes it possible for load 2 not to be subjected to lateral deflection, the load remaining centered on the conveyor.

For reasons of operating security, stop 3 comes into contact with the load at a certain distance from its lateral edge 4, as illustrated in FIG. 1a. This makes it possible to guarantee contact between stop 3 and load 2 even if the latter is slightly decentered on the linear conveyor.

Figure 2:
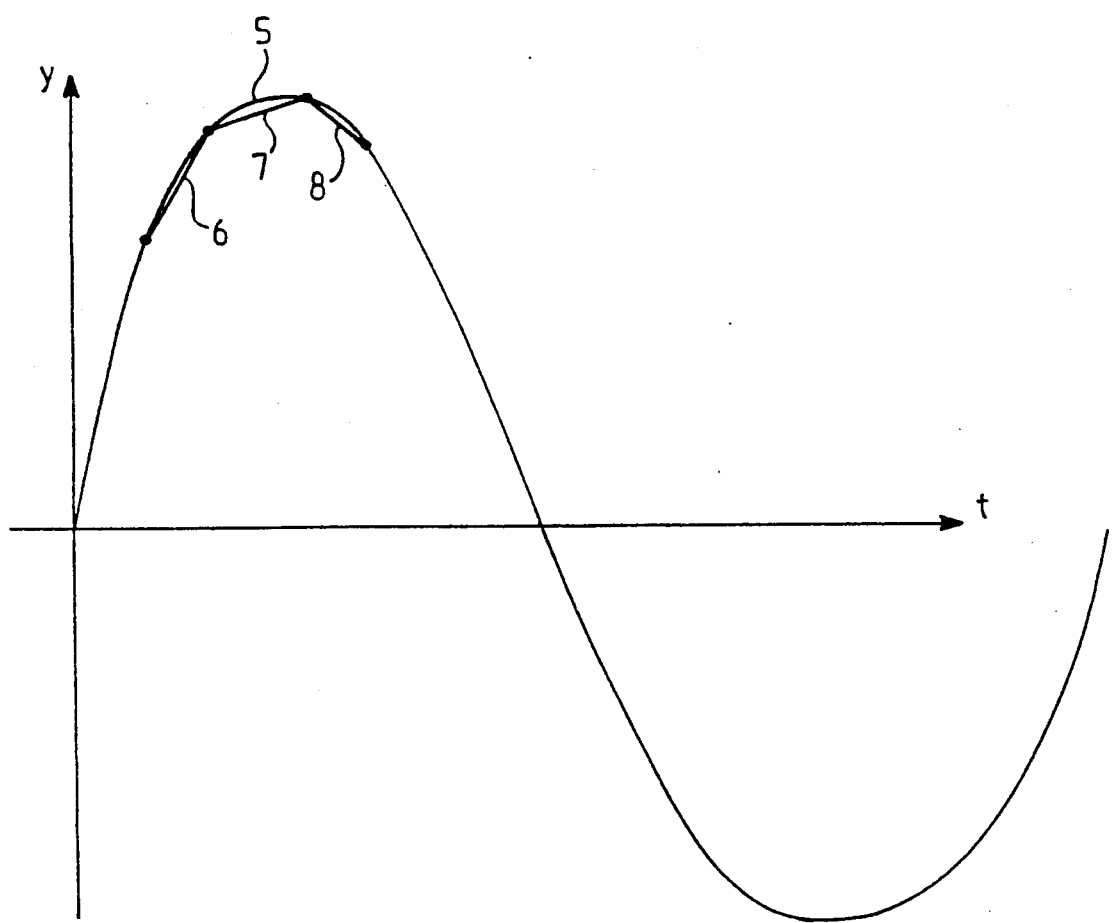

Studies have shown that the perfect mathematical movement that should be described by stop 3 corresponds to a peak segment of a sine curve as illustrated in FIG. 2 by reference number 5. The abscissa corresponds to the time that has elapsed and the ordinate to the amplitude of transverse displacement.

Perfect sinusoidal movement of the stop is not, however, necessary in the application of the palletizer. That is why, according to the present invention, the real displacement effected by stop 3 breaks down into linear approximations 6, 7 and 8, which are more or less numerous and which constitute the approximation of the peak of the sine curve 5, as illustrated in FIG. 2, a minimum number of two linear movements at least being desirable. The offsetting of stop 3 in relation to lateral edge 4 (see FIG. 1a) contributes to the use of this approximation.

The movement of mobile stop 3 is controlled, according to a preferred form of embodiment of the invention, by a stepping motor 11. This motor is itself slaved to a programmable controller 12, or any other precise, rapid control means. Further, as discussed above, two successive controlled mobile stops can be used to obtain 180° rotation of the load. In this instance, as illustrated in FIG. 1(c), the first stop 3 driven by stepping motor 11 permits the load to be rotated to an angle of to 90°, and the second stop 3' driven by steeping motor 11' permits the load to be rotated to an angle up to 180°. Also, in FIG. 1(c), the lateral surface for stop 3' is depicted as 4'.

To pilot the stop or stops, a man of the art will take into account the following conditions:

either a load, as shown especially in FIG. 1, having a width "2l", a length "2L", a conveyor displacement speed "V" and an offset of the stop "d" in relation to the side of the load where it will act to permit rotation, as shown in particular in FIG. 1a, the sine curve equation is given by the following formula:

$$y = r \sin\left[\alpha + \left(\frac{\pi V}{2(L + 1 - d)}\right) \times t\right]$$

with $$\alpha = \text{arctg}\left(\frac{1-d}{L}\right) \text{ and } r = \sqrt{L^2 + (1-d)^2},$$

for the linear approximations, for example in the case of two approximations on either side of $Y_{max} = r$, we have the following equations:

* from $t = o$ to $t = 1$ with $$t_1 = \frac{(L + 1 - d)(\pi - 2\alpha)}{\pi V}$$

$$y = 1 - d + \left[\frac{r - 1 + d}{t_1}\right] \times t,$$

* $t = t_1$ to $t = \frac{L + 1 - d}{V}$ $$y = r - \left[\frac{r - L}{\left(\frac{L + 1 - d}{V}\right) - t_1}\right] \times (t - t_1)$$

Figure 3:
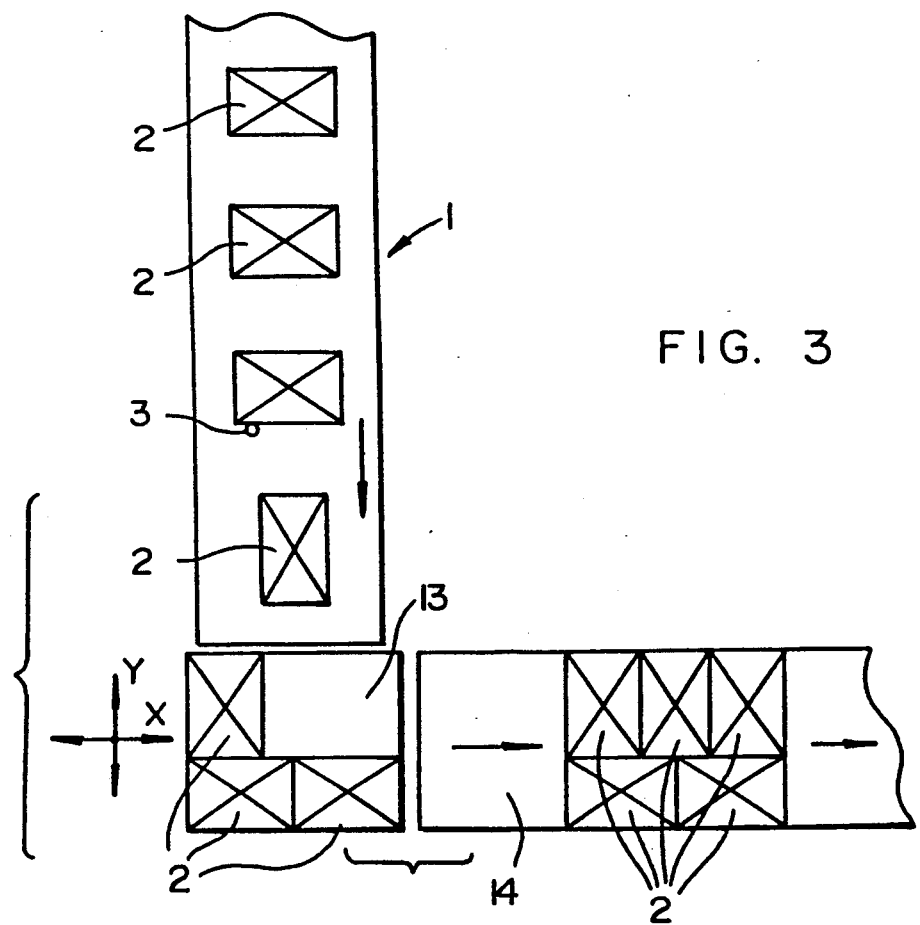

Such a device will find one of its applications in the field of palletization and will advantageously equip the supply conveyor of the palletizer to facilitate the storage of the loads or packages on the pallet. FIG. 3 schematically illustrates a conventional palletizer 13 together with the apparatus for orienting the loads of the present invention. More specifically, the apparatus with conveyor 1 and stop 3 is positioned in conjunction with a palette 13 movable along X and Y directions so as to arrange loads 2 according to a desired geometry. When the palette 13 is completely filled, it can be removed by another conveyor schematically represented as 14.

Other embodiments of the present invention, within the reach of a man of the art, could also have been contemplated without thereby departing from the scope thereof.

What is claimed an new is:

1. Apparatus for orienting loads on a linear conveyor comprising:
   (a) a motorized linear conveyor on which loads to be oriented are adapted to be positioned, said motorized linear conveyor being capable of creating a linear advance movement of the loads on the conveyor;
   (b) at least one movable stop capable of being transversely displaced with respect to linear advance movement of the conveyor, said at least one movable stop projecting through said motorized linear conveyor; and
   (c) means for controlling the transverse displacement of said at least one movable stop in order to produce a rotational movement of the load, said at least one movable stop being controlled to follow the rotational movement of the load as the load follows the linear advance movement of the conveyor, and to contact the load at substantially a fixed point.

2. The apparatus according to claim 1, wherein said at least one movable stop contacts the load exactly at a fixed point.

3. The apparatus according to claim 1, wherein said means for controlling the transverse displacement of said at least one movable stop is capable of causing said at least one movable stop to contact the load at a distance from a lateral edge of the load.

4. The apparatus according to claim 1, wherein said means for controlling the transverse displacement of said at least one movable stop produces a sinusoidal peak movement when the displacement of said at least one movable stop is plotted against time.

5. The apparatus according to claim 4, wherein said sinusoidal peak movement is formed by several linear movements of said at least one movable stop means.

6. The apparatus according to claim 1, wherein said means for controlling the transverse displacement of said at least one movable stop includes at least one stepping motor.

7. The apparatus according to claim 6, wherein said means for controlling the transverse displacement of said at least one movable stop includes a programmable controller for controlling said at least one stepping motor.

8. The apparatus according to claim 1, wherein said at least one movable stop comprises two movable stops to permit rotation of the load to ±180°.

9. The apparatus according to claim 1, wherein said motorized linear conveyor comprises a conveyor having a motorized roller track.

10. In combination, a palletizer and an apparatus for orienting loads as defined by claim 1.

* * * * *